US012796622B2

(12) United States Patent
Gautier et al.

(10) Patent No.: US 12,796,622 B2
(45) Date of Patent: Nov. 17, 2026

(54) PORTABLE ELECTRIC PRUNING SHEARS WITH CONTACTLESS SECURITY SYSTEM

(71) Applicant: INNOVATION FABRICATION COMMERCIALISATION INFACO, Cahuzac-sur-Vère (FR)

(72) Inventors: David Gautier, Gaillac (FR); Christophe Gout, Castelnau-de-Lévis (FR); Jørn Eskildsen, Tørring (DK); Lau Kofoed Kierstein, Vejle (DK)

(73) Assignee: INNOVATION FABRICATION COMMERCIALISATION INFACO, Cahuzac sur Vère (FR)

( * ) Notice: Subject to any disclaimer, the term of this patent is extended or adjusted under 35 U.S.C. 154(b) by 349 days.

(21) Appl. No.: 18/044,799

(22) PCT Filed: Sep. 10, 2021

(86) PCT No.: PCT/EP2021/074992

§ 371 (c)(1),
(2) Date: Mar. 10, 2023

(87) PCT Pub. No.: WO2022/053645

PCT Pub. Date: Mar. 17, 2022

(65) Prior Publication Data

US 2023/0345882 A1 Nov. 2, 2023

(30) Foreign Application Priority Data

Sep. 11, 2020 (EP) .................................... 20306015

(51) Int. Cl.
*A01G 3/037* (2006.01)
*F16P 3/14* (2006.01)

(52) U.S. Cl.
CPC .............. *A01G 3/037* (2013.01); *F16P 3/147* (2013.01)

(58) Field of Classification Search
CPC ... F16P 3/12; F16P 3/147; F16P 3/142; A01G 3/037; B26B 15/00; B26D 7/24
See application file for complete search history.

(56) References Cited

U.S. PATENT DOCUMENTS 5,669,809 A * 9/1997 Townsend .............. A22C 17/12
452/125
7,281,403 B2 * 10/2007 Sperrer .................. F16P 3/144
72/21.2

(Continued)

FOREIGN PATENT DOCUMENTS

FR 2712837 A1 6/1995
FR 2831476 A1 5/2003

(Continued)

OTHER PUBLICATIONS

European Search Report received for EP 20306015 dated Feb. 16, 2021.

(Continued)

*Primary Examiner* — Laura M Lee
(74) *Attorney, Agent, or Firm* — Greer, Burns & Crain, Ltd

(57) ABSTRACT

A portable electric pruning shears includes a longitudinal body intended to be held by one hand of a user, called the holding hand, a cutting tool arranged at a distal end of the body, an electric motor for operating the cutting tool, and a security system provided to protect the user.

16 Claims, 3 Drawing Sheets

(56) References Cited

U.S. PATENT DOCUMENTS

| | | | | |
|---|---|---|---|---|
| 7,936,094 | B2 * | 5/2011 | Rossi | F16P 3/145<br>307/326 |
| 8,207,858 | B2 * | 6/2012 | Knopf | E04G 21/32<br>340/5.1 |
| 10,663,113 | B2 * | 5/2020 | Dolivo | F16P 3/147 |
| 10,710,180 | B2 * | 7/2020 | Guynn | B27B 13/14 |
| 10,837,599 | B2 * | 11/2020 | Hanf | F16P 3/147 |
| 11,130,251 | B2 * | 9/2021 | Pellenc | A01G 3/037 |
| 11,358,297 | B2 * | 6/2022 | Pellenc | B26D 7/22 |
| 11,384,901 | B2 * | 7/2022 | Pellenc | A01G 3/037 |
| 11,899,838 | B2 * | 2/2024 | Hogbin | G06F 3/017 |
| 12,179,376 | B2 * | 12/2024 | Grasselli | B26D 7/24 |
| 2019/0234559 | A1 * | 8/2019 | Guynn | B27G 19/02 |
| 2024/0004467 | A1 * | 1/2024 | Deboon | G06F 3/017 |

FOREIGN PATENT DOCUMENTS

| | | | | |
|---|---|---|---|---|
| FR | 2846729 A1 | | 5/2004 | |
| FR | 2963081 A1 | | 1/2012 | |
| FR | 3074712 A1 | * | 6/2019 | F16P 3/12 |
| KR | 10-2015-0035840 A | | 4/2015 | |
| KR | 102731033 B1 | * | 11/2024 | B26D 7/22 |

OTHER PUBLICATIONS

International Search Report and Written Opinion received for PCT/EP2021/074992, mailed Dec. 1, 2021.

Communication received in EP Application No. 20306015.7, dated Apr. 8, 2024.

* cited by examiner

PORTABLE ELECTRIC PRUNING SHEARS WITH CONTACTLESS SECURITY SYSTEM

BACKGROUND

The present invention relates to a portable electric pruning shears equipped with contactless security system.

The field of the invention is the field of the portable electric pruning shears, and more particularly the fields of portable electric pruning shears equipped with security system preventing a user of the pruning shears from injury.

Portable electric pruning shears generally comprise a longitudinal body intended to be held by a hand of a user, a cutting tool arranged on a distal end of the body and an electric motor for operating said cutting tool. The body is generally fitted with a trigger used to control the functioning of the electric motor.

Portable electric pruning shears are of common use for pruning fruit trees and especially for pruning grape vines. When pruning a fruit tree, the user generally holds the pruning shear in one hand and the other hand, also called the free hand, generally manipulates a portion of the tree branch or the fruit itself. Thus the user can adjust the positioning of the cutting tool of the pruning shears. But, the presence of the free hand of the user at a close proximity of the cutting tool is dangerous and can lead to serious injury of the user.

To prevent injury of the user, the portable electric pruning shears are equipped with security systems. Most of those security systems require a physical contact between the cutting tool and the body of the user, or a conductive garment worn by the user. Those systems provide limited security for the user as they require physical contact with the user and do not always avoid injury.

There are known security systems for pruning shears based on a measurement of the electrical capacity between the cutting tool and the user. Those systems, although claiming a contactless security, are not effective and are sensitive to disturbances caused by moisture, metal wires, etc. frequently found in the vineyards.

A purpose of the present invention is to overcome at least one of these drawbacks.

Another purpose of the invention is to propose a portable electric pruning shears safer to use.

Yet another purpose of the present invention is to propose a portable electric pruning shears that completely avoids injury of the operator using it.

SUMMARY

The invention makes it possible to achieve at least one of these aims by a portable electric pruning shears comprising:

- a longitudinal body intended to be held by one hand of a user, called the holding hand,
- a cutting tool arranged at a distal end of said body,
- an electric motor for operating said cutting tool, and
- a security system provided to protect said user;

wherein said security system comprises:

- an emitter for emitting at least one electromagnetic wave and a receiver for receiving at least one electromagnetic wave emitted by said emitter, one of which is embedded by said portable electric pruning shears and the other one of which is intended to be worn by the other hand of the user, called the free hand, and
- a control unit for acting on the operating of the cutting tool as a function of the wave(s) received by said receiver.

Thus, the present invention provides a portable electric pruning shears equipped with a security system based on the use of at least one electromagnetic wave. Electromagnetic waves are not, or very little, sensitive to humidity, moisture of metal wires, compared to electrical capacitance for example. Thus, the security system of the pruning shears of the present invention is less sensitive to environmental conditions compared to existing security system equipping the portable electrical pruning shears. As a consequence, the portable pruning shears of the present invention provides better security of use compared to existing portable pruning shears.

Plus, the security system of the pruning shears of the present invention is configured to detect the free hand of the user based on the transmission of electromagnetic waves, which does not require a physical contact between the free hand of the user and the cutting tool. Thus, the portable pruning shears of the present invention completely avoids injury of the user because it's security system can be programmed to stop, or to open, the cutting tool of the pruning shears before the free hand of the user touches the cutting tool.

The emitter can comprise only one emitting module.

Advantageously, the emitter can comprise several emitting modules, each emitting a different wave in a different direction.

Thus, the present invention provides an emitter capable of emitting waves in specific directions. As a consequence, the detection and the tracking of the emitter by a receiver is improved.

Consequently, the safety provided by the security system is improved.

In a preferred embodiment, the emitting modules of the emitter are arranged so that the emitter can emit waves in directions perpendicular one another.

In a preferential embodiment, the emitting modules of the emitter are arranged so that the emitter can emit waves in three different directions, each perpendicular one another, corresponding to the three directions in space.

In a more preferential embodiment, the emitter comprise three emitting modules arranged so that the emitter can emit waves in three different directions, each perpendicular one another, corresponding to the three directions in space.

In an embodiment, an emitting module can be any type of emitting module, for example a patch antenna.

Advantageously, at least one, in particular each, emitting module can comprise an emitting coil.

Thus, the present invention provides a portable electric pruning shears equipped with emitting module that is widely available and can be miniaturised to a small form factor and still remain fully functional.

As a consequence, the portable electric pruning shears is precise and cheaper to produce. The small footprint of the emitting module makes it easy to position and integrate to a new or to a pre-existing electric pruning shears security system.

Alternatively, or in addition, the emitter may be a miniaturised mono-block unit.

In an embodiment, the emitter can be integral with, or embedded in, the body of the pruning shears.

Advantageously, the emitter can be intended to be worn by the free hand of the user.

Thus, the receiver can be placed on/in the pruning shears. In this embodiment, the received electromagnetic waves may be analysed at level of the pruning shears and the control module can readily act on the pruning shears. This embodiment is easier to implement, and provides faster acting on the operating of the pruning shears in case of danger, compared to the embodiment where the receiver is not on the side of the pruning shears.

Advantageously, the emitter can be integral with a glove, or wristband, intended to be worn by the free hand of the user.

Thus, the present invention provides a wearable apparatus such as a glove or a wristband comprising the emitter. Thus, the location of the emitter within the apparatus can be chosen, or at least be known. For example, the emitter can be located on the part of a glove corresponding to the tip of a finger or the centre of the palm.

As a consequence, in use, the position of the free hand of the user can be more reliably determined in relation to the position of the emitter, improving the effectiveness of the security system.

Additionally, integrating the emitter to a wearable apparatus improves the ease of use of the security system and the portable electric pruning shears.

Advantageously, the emitter can be powered with an embedded battery, in particular a rechargeable embedded battery.

Thus, the present invention provides an emitter that is powered independently from the pruning shears. As a consequence, the emitter and its battery may be located freely and independently from the pruning shears.

Plus, the emitter is also less cumbersome as power cables no longer need to connect the emitter to the power supply of the pruning shears.

Alternatively, the emitter can be powered with the power supply of the pruning shears. As a consequence, both the pruning shears and the emitter are relying on the same power source. This makes the pruning shears more secure by reducing the risks of operating the cutting tool when the emitter isn't powered.

The receiver can comprise only one receiving module.

Advantageously, the receiver can comprise several receiving modules, each receiving a wave incident in a different direction.

Thus, the present invention provides a receiver capable of detecting the position of an emitter in different directions. As a consequence, the security system can more reliably track the position of the emitter, therefore increasing the safety of the security system.

In a preferred embodiment, the receiving modules of the receiver may be arranged so that the receiver can receive waves incident in directions that are perpendicular to each other.

In a preferential embodiment, the receiving modules of the receiver may be arranged so that the receiver can receive incident waves in three different directions, each being perpendicular to the other directions, corresponding to the three directions in space.

In a more preferential embodiment, the receiver comprise three receiving modules arranged so that the receiver can receive incident waves in three different directions, each being perpendicular to the other directions, corresponding to the three directions in space.

In an embodiment, a receiving module can be any type of emitting module, for example a patch antenna.

Advantageously, at least one receiving module can comprise a receiving coil.

Thus, the present invention provides a portable electric pruning shears equipped with a receiving module that is widely available and can be miniaturised to a small form factor and still remain fully functional.

As a consequence, the portable electric pruning shears is precise and cheaper to produce. The small footprint of the receiving module makes it easy to position and integrate to a new or to a pre-existing electric pruning shears security system.

Alternatively, or in addition, the emitter may be a miniaturised mono-block unit.

In an embodiment, the receiver is intended to be worn by the free hand of the user.

For example, the receiver may be integral with a wristband or a glove intended to be worn by the free hand of the user.

Advantageously, the receiver can be integral with, or embedded in, the body of the pruning shears.

As a consequence, the receiver is ideally located to send a signal to the control unit, especially for but not limited to an embodiment with the control unit also integral with, or embedded in, the body of the pruning shears. Contrary to embodiments where the receiver is distinct form the body of the pruning shears, the receiver of this embodiment can efficiently send a signal to the control unit without relying on wireless, or wired, transmission such as Bluetooth. The reactivity of the safety system of the pruning shears is improved.

Advantageously, the receiver can be integral with, or embedded in a removable piece of a casing of said body.

Thus, the present invention provides a receiver that can be easily attached to and removed from the pruning shears. As a consequence, the ease of maintenance of the security system is improved.

Preferentially, the removable receiver can be connected to a circuit board of the pruning shears via a connector present on the circuit board. As a consequence, the removable receiver can easily be implemented onto existing pruning shears.

Advantageously, the receiver can be powered with the power supply of the pruning shears.

Thus, the present invention provides a receiver that can be powered with the power supply of the pruning shears. As a consequence, both the pruning shears and the receiver are relying on the same power source. This makes the pruning shears more secure by reducing the risks of operating the cutting tool when the emitter isn't powered.

Plus, there is no need for and additional power supply individual or dedicated for the receiver, reducing the cost and the footprint of the safety system.

Alternatively, the receiver can be powered with a dedicated embedded battery, in particular a rechargeable battery.

Advantageously, the control unit can act on the electrical motor, or on a controller of the pruning shears, in order to trigger a command directed to said motor or said controller for modifying the operating of the cutting tool.

The command may request stopping the cutting tool, and/or opening the cutting tool. The stopping of the cutting tool may be obtained by:

- stopping the motor;
- activating a breaking means, for example mechanical or electrical means; and/or
- the engine break of the motor.

Thus, the present invention provides a portable electric pruning shears capable of stopping the movement of the cutting tool and/or opening it, as a function of the wave(s) received by the receiver.

As a consequence, the safety of the portable electric pruning shears is improved. Indeed, the safety system is able to stop the cutting tool before the free hand of the user comes in contact with the tool. Additionally, the safety system is able to open the cutting tool, making the pruning shears safer, even in an improbable event where the free hand of the user would come in contact with the cutting tool before it was stopped.

Advantageously, the control unit can be programmed to:

calculate a distance of the emitter with respect to the receiver based on the wave(s) received by the receiver, compare said distance to at least one predetermined threshold value; and act on the operating of the cutting tool, when said distance is below said threshold value.

Thus, the present invention provides a portable electric pruning shears capable of acting on the operating of the cutting tool when the emitter is at a distance from the receiver lower than a pre-set value. As a consequence, it is possible to set, for example a spherical, volume that comprise the entire cutting tool, around one of said emitter or receiver, with a radius equal to the threshold value. It is then impossible for the receiver, respectively emitter, to come in contact with the cutting tool without the calculated distance passing below the threshold.

Preferentially, the volume is positioned as close as possible to the cutting tool.

Consequently, the security system of the pruning sheer can be configured to prevent the free hand from ever coming in contact with the cutting tool. Therefore, the safety of the pruning shears is improved.

Advantageously, the control unit can be programmed to:

calculate a position of the emitter in a tridimensional coordinate system of the receiver, based on the wave(s) received by the receiver, compare said position to a predetermined volume in said tridimensional coordinate system of the receiver; and act on the operating of the cutting tool, when said position is comprised in said predetermined volume.

Thus, the present invention provides a portable electric pruning shears capable of acting on the operating of the cutting tool when the emitter enters a predetermined volume set in the tridimensional coordinate system of the receiver.

As a consequence, it is possible to define the volume to comprise the cutting tool and surround it more closely. It is also possible to define the volume so that it does not comprise the receiver. Consequently, the security system is more efficient and the pruning shears more useable as the control unit will generate less false positives, especially when the emitter approaches the receiver form the proximal end of the pruning shears body.

For example, it is possible to have the predefined volume set in such a way that an emitter placed:

10 cm in front of the pruning shears, on the cutting tool's side of the shears, would be comprised in said predefined volume, 10 cm behind the pruning shears, on the side of the shears opposite to cutting tool, would not be comprised in said predefined volume, and 10 cm laterally to body the pruning shears, in a direction radial to the shears body, would not be comprised in said predefined volume.

This is particularly well adapted to, but not limited to, embodiments with a receiver integral with, or embedded in, the body of the pruning shears and said receiver capable to receive waves incident in three different directions, each perpendicular from one another.

Advantageously, the control unit can be programmed to:

calculate a speed, said approaching speed, at which the emitter approaches the receiver, and act on the operating of the cutting tool as a function of said approaching speed.

Thus, the present invention provides a portable electric pruning shears capable of acting on the operating of the cutting tool based the approaching speed of the emitter.

As a consequence, the operating of the cutting tool can be stopped if the emitter approaches the receiver too rapidly. This drastically reduces the chance of the free hand touching the cutting tool while it is being operated. Therefore, the safety of the pruning shears is improved.

For example, the control unit can determine the approaching speed by:

calculating a first distance of the emitter with respect to the receiver and/or a first position of the emitter in a tridimensional coordinate system of the receiver, based on the wave(s) received by the receiver, memorising said first distance and/or position and the time at which it was calculated, calculating a second distance of the emitter with respect to the receiver and/or a second position of the emitter in a tridimensional coordinate system of the receiver, based on the wave(s) received by the receiver, memorising said second distance and/or position and the time at which it was calculated, calculating the approaching speed of the emitter from:

the variation of the distance between the emitter and the receiver, calculated either from the first and second calculated distances or the first and second calculated positions of the emitter in the tridimensional coordinate system of the receiver, and the variation of time between first and second calculated distances or positions.

In an embodiment, the distances and/or positions as well as the approaching speed is calculated at regular and short intervals, for example at an interval comprised between 1 second and 4 milliseconds.

In an embodiment, the control unit of a security system can act on the operating of the cutting tool when the approaching speed reaches a pre-set value.

Advantageously, the threshold distance value, and/or the size of the predetermined volume can vary as a function of the approaching speed.

Thus, the present invention provides a portable electric pruning shears capable of acting on the operating of the cutting tool based the distance and/or position of the emitter with respect to the receiver as well as the approaching speed of the emitter.

As a consequence, it is possible to increase the threshold value and/or the predetermined volume if the emitter approaches the receiver too rapidly. The chance of the free hand touching the cutting tool while it is being operated is then reduced. Therefore, the safety of the pruning shears is improved.

It is also possible to set a smaller predetermined distance and/or volume that allows the emitter to come closer to the cutting tool when moved at a slow and controlled pace. This can be done without compromising the safety of use of the shears as the distance and/or volume used to decide whether or not to act on the operating of the cutting tool is adapted with regard to the approaching speed. Therefore, the security system is more efficient and the pruning shears more useable.

In a preferred embodiment, predetermined threshold value and/or a predetermined volume is only adapted if the approaching speed is positive, in other words if the emitter is getting closer to the receiver.

The predetermined threshold value and/or a predetermined volume can for example be adapted proportionally to the approaching speed.

Alternatively, or in addition, the threshold value and/or a predetermined volume can be adapted only if the approaching speed reaches a pre-set value.

Advantageously, the control unit of the security system can be integrated in a controller of the pruning shears.

Thus, the present invention provides a portable electric pruning shears with a better integration of the control unit. The control unit being integrated in the controller, this reduce the cables and connections required which in turn reduces the points of failure and therefore makes the portable electric pruning shears more reliable.

Advantageously, the cutting tool can comprise a moving blade and a fixed blade.

Alternatively, the cutting tool can comprise two moving blades.

BRIEF DESCRIPTION OF THE DRAWINGS

Other advantages and characteristics will become apparent on examination of the detailed description of an embodiment which is in no way limitative, and the attached figures, where.

DETAILED DESCRIPTION

It is well understood that the embodiments that will be described below are in no way limitative. In particular, it is possible to imagine variants of the invention comprising only a selection of the characteristics described hereinafter, in isolation from the other characteristics described, if this selection of characteristics is sufficient to confer a technical advantage or to differentiate the invention with respect to the state of the prior art. Such a selection comprises at least one, preferably functional, characteristic without structural details, or with only a part of the structural details if this part alone is sufficient to confer a technical advantage or to differentiate the invention with respect to the prior art.

In the figures, elements common to several figures retain the same reference.

Figure 1:
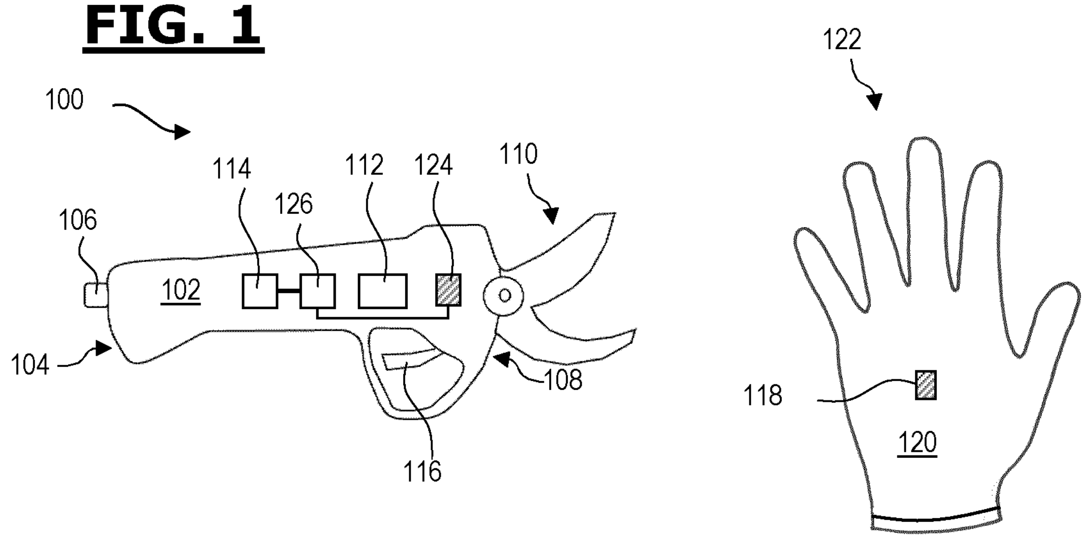
FIG. 1 is a schematic representation of a non-limitative example of a portable electric pruning shears according to the invention.

FIG. 1 is a schematic representation of a non-limitative example of a portable electric pruning shears according to the invention.

The pruning shears 100, represented in FIG. 1, comprises a longitudinal body 102 intended to be held by one hand of a user (not illustrated in FIG. 1).

At one end of the longitudinal body 102, called proximal end 104, the pruning shears 100 comprises a power connector 106, to which a power cable can be connected to power the pruning shears 100.

In an alternative embodiment, the pruning shears may comprise an embedded power supply.

At the opposite end of the longitudinal body, called distal end 108, the pruning shears 100 comprises a cutting tool 110.

In addition, the pruning shears 100 comprises, embedded in its longitudinal body 102 an electric motor 112 for operating the cutting tool 110.

The pruning shears 100 also comprises a controller 114 that commands the electric motor 112.

In addition, the pruning shears 100 comprises a physical trigger 116 that can be used to send an activation signal to the controller 114 when pulled.

According to the invention, the pruning shears 100 also comprises a security system that comprises:

- an emitter 118, distinct from the longitudinal body 102 and integral with a glove 120 worn by the hand of the user not holding the pruning shears 100, called free hand 122;
- a receiver 124, embedded in the longitudinal body 102 and located close to the distal end 108, and in particular as close as possible to the cutting tool 110; and
- a control unit 126, embedded in the longitudinal body 102.

The emitter 118 is located in a part a glove 120 corresponding to the centre of the back of the hand 122. The emitter 118 can either be powered by the same power source as the shears or be powered by a battery embedded in/on the glove, neither of which are illustrated in FIG. 1. The emitter 118 of the security system is for emitting at least one electromagnetic wave.

The receiver 124 of the security system is for receiving at least one electromagnetic wave emitted by the emitter 118. As a function of the wave(s) received by the receiver 124, the control unit 126 can act on the operating of the cutting tool 110, by acting on the controller 114 in order to trigger a command stopping the operating of the cutting tool 110, and the opening of the cutting tool 110. Alternatively, or in addition, the control unit 126 could act on the operating of the cutting tool 110, by acting directly on the electric motor 112.

Figure 4:
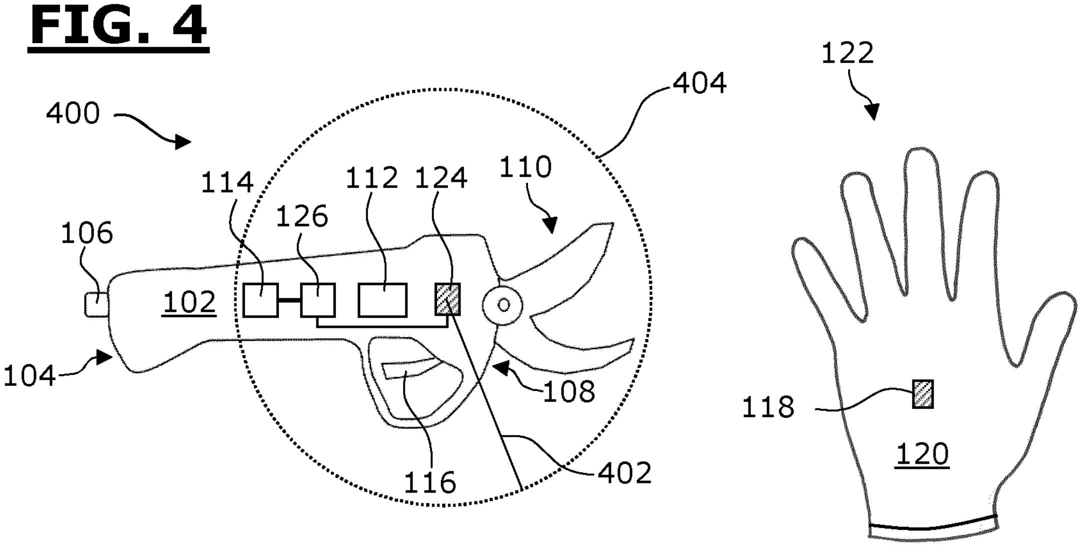
FIG. 4 is a schematic representation of another non-limitative example of a portable electric pruning shears according to the invention.
Figure 5A:
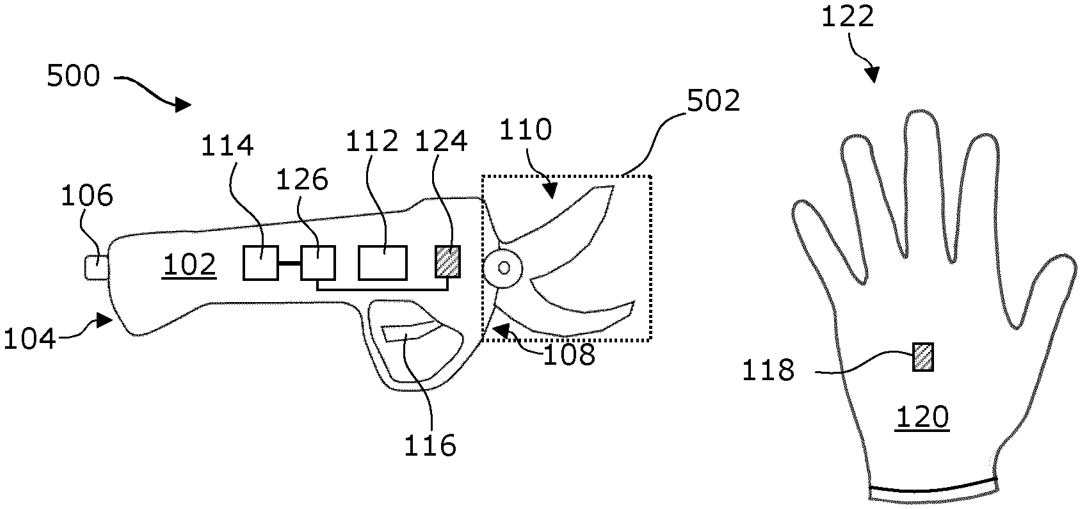
FIG. 5*a* and FIG. 5*b* are schematic representations of another non-limitative example of a portable electric pruning shears according to the invention.
Figure 5B:
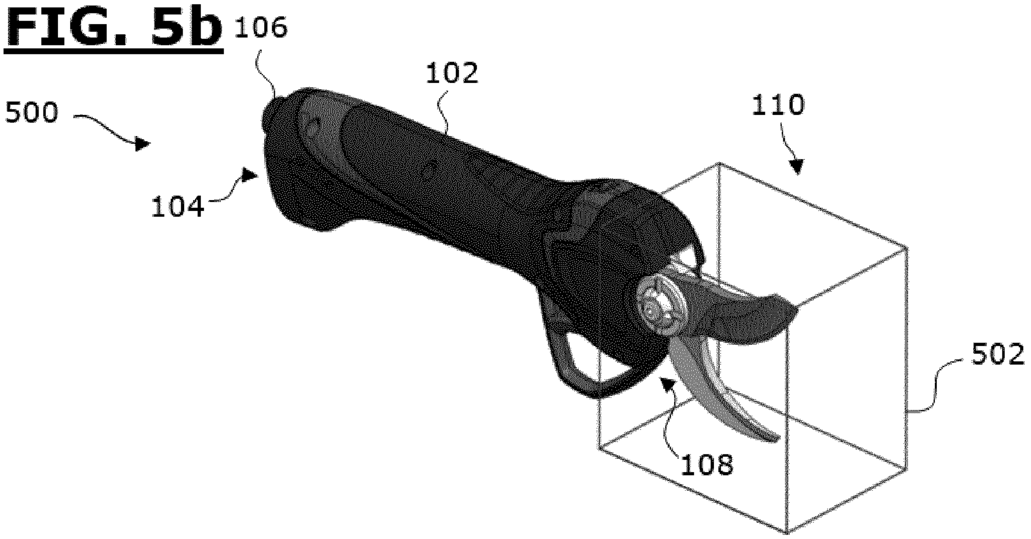
Figure 6:
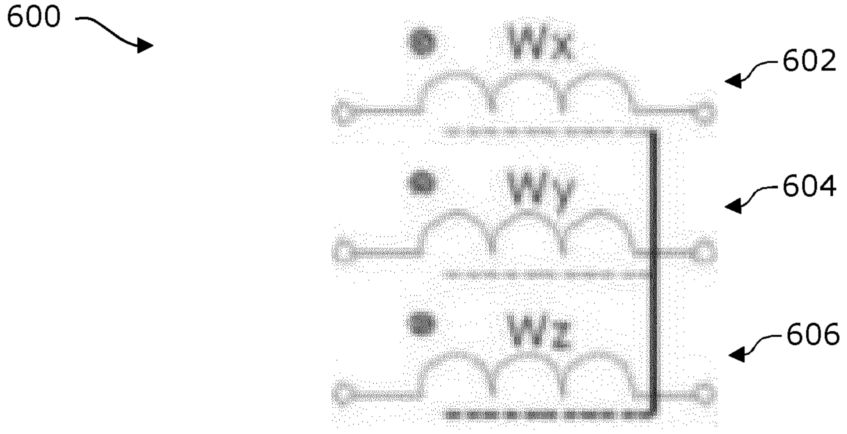
FIG. 6 is a diagrammatic representation of a non-limitative example of device that can be used as an emitter or as a receiver.

More specifically, the control unit 126 is capable of calculating either:

- the distance between the emitter 118 and the receiver 124, as described in more details in relation to FIG. 4; or
- the position of the emitter 118 in a tridimensional coordinate system of the receiver 124, as described in more details in relation to FIG. 5 and FIG. 6.

Other embodiments will appear obvious to the man skilled in the art, for example embodiments where the emitter 118 embedded in the longitudinal body 102 and the receiver 124 is distinct from the longitudinal body 102 and integral with the glove 120.

Figure 2:
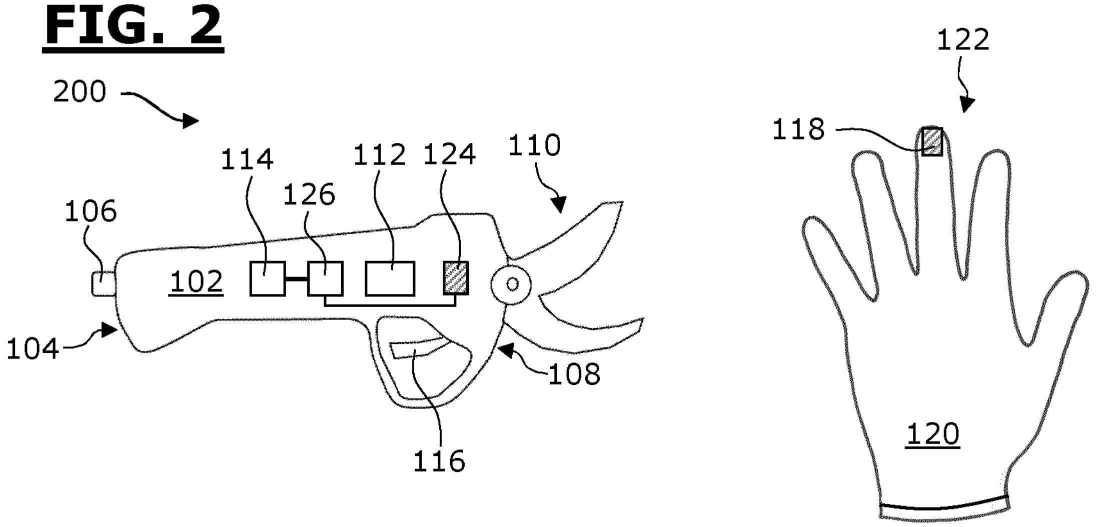
FIG. 2 is a schematic representation of another non-limitative example of a portable electric pruning shears according to the invention.

FIG. 2 is a schematic representation of another non-limitative example of a portable electric pruning shears according to the invention.

The pruning shears 200 illustrated on FIG. 2 differs from the pruning shears of FIG. 1 in that the emitter 118 is located in a part of the glove 120 corresponding to the tip of a finger, more specifically the tip of the middle finger.

Other embodiments will appear obvious to the man skilled in the art, for example embodiments where the emitter 118 is located in another part of the glove 202 such as the tip of another finger or next to the wrist.

Figure 3:
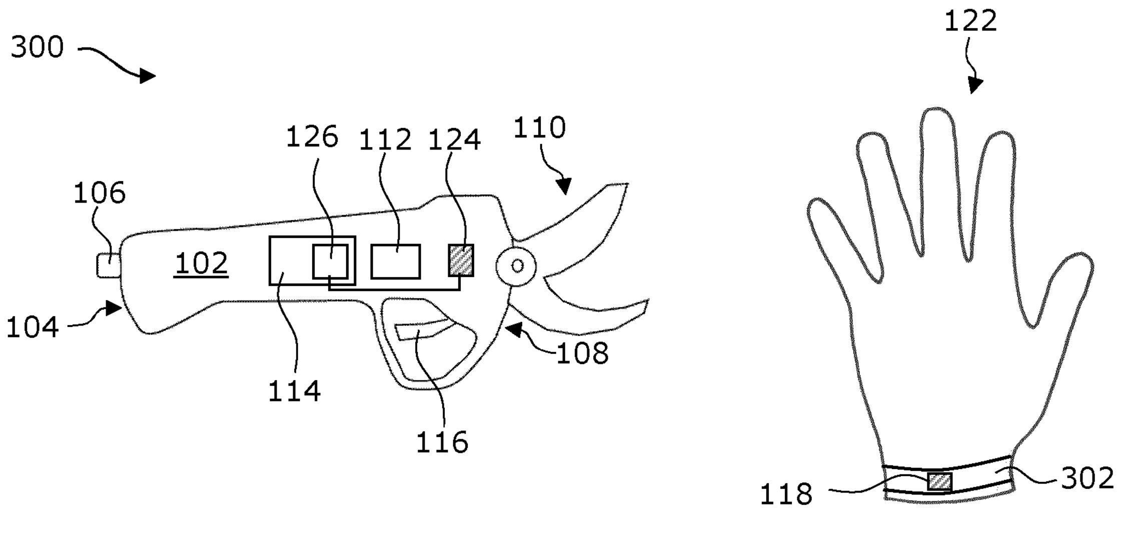
FIG. 3 is a schematic representation of another non-limitative example of a portable electric pruning shears according to the invention.

FIG. 3 is a schematic representation of another non-limitative example of a portable electric pruning shears according to the invention.

The portable electric pruning shears 300 of FIG. 3 differs from the pruning shears of FIG. 1 in a couple places.

Firstly, the emitter 118 is now integral with a wristband 120 replacing the glove 102.

Secondly, the control unit 126 is integrated in the controller 114.

FIG. 4 is a schematic representation of another non-limitative example of a portable electric pruning shears according to the invention.

FIG. 4 illustrates a portable electric pruning shears 400 that comprises all the elements of pruning shears 100 of FIG. 1.

The security system of the pruning shear is configured to provide security base on the distance between the emitter and the receiver.

To do so, the control unit 126 of the pruning shears 400 is programmed to:

- calculate the distance of the emitter 118 with respect to the receiver 124 based on the wave(s) received by the receiver 124, and especially based on the amplitude and the strength of the signal, for example the amplitude of the voltage or the current of the received wave;
- compare said distance to at least one predetermined threshold value or distance 402; and
- act on the operating of the cutting tool 110, when said distance is below said threshold distance 402.

The distance 402 being calculated with respect to the receiver 124, the threshold distance 402 forms a spherical volume 404 surrounding the receiver 124, schematically illustrated as a circle in FIG. 4. If the emitter 118 were to enter said volume it would trigger the control unit 126 that would then act on the operating of the cutting tool 110.

The threshold distance 402 is preferably configured so that the spherical volume 404 includes the cutting tool 110.

FIG. 5*a* and FIG. 5*b* are schematic representations of another non-limitative example of a portable electric pruning shears according to the invention.

FIG. 5*a* and FIG. 5*b* illustrates, respectively by a side view and by an isometries view, a portable electric pruning shears 500 that comprises all the elements of pruning shears 100 of FIG. 1.

The pruning shears 500 differ from the pruning shears 400 of FIG. 4 in that its security system is based on position. To do so, the control unit 126 of the pruning shears 400 is programmed to:

- calculate the position of the emitter 118 in a tridimensional coordinate system of the receiver 124, based on the wave(s) received by the receiver 124, and especially based on the amplitude and the strength of the signal, for example the amplitude of the voltage or the current of the received wave, in each direction;
- compare said position to a predetermined volume 502 in said tridimensional coordinate system of the receiver 124;
- act on the operating of the cutting tool 110, when said position is comprised in said predetermined volume 502.

The predetermined volume 502, schematically illustrated as a square in FIG. 5, is defined in the tridimensional coordinate system of the receiver 124. However, said volume 502 does not need to include the receiver 124. It is therefore possible in this embodiment to set up the predetermined volume 502 to comprise the cutting tool 110 while surrounding it more closely.

The predetermined volume 502 used by the security system of the pruning shears 500 has a cubic shape that comprise the cutting tool 110, even in its open position.

Other embodiments will appear obvious to the man skilled in the art, for example embodiments where the predetermined volume has a more complex shape that comprise the cutting tool more closely, such as pyramids, discs etc . . . .

Although security based on the distance or on position is only described with respect to FIG. 4, FIG. 5*a* and FIG. 5*b*, those security systems can be implemented in any of the embodiments described in relation to FIGS. 1 to 3.

FIG. 6 is a diagrammatic representation of a non-limitative example of device that can be used as an emitter or as a receiver.

FIG. 6 illustrates a device 600 that can be used as an emitter or as a receiver and that comprises three coils 602, 604 and 606.

The first coil 602 is oriented with an x axis. The second coil 604 is oriented with an y axis perpendicular with the x axis. The third coil 606 is oriented with an z axis, perpendicular with both the x and y axis.

Thus, if the device 600 is used as an emitter, then:

- the first coil 602 is capable of emitting waves in the direction corresponding to the x axis,
- the second coil 604 is capable of emitting waves in the direction corresponding to the y axis, and
- the third coil 606 is capable of emitting waves in the direction corresponding to the z axis.

In alternative embodiments, each of the coil can be replaced by another emitting module, for example a patch antenna, orientated in the same direction as the coil it replaces.

Additionally, if the device 600 is used as a receiver, then:

- the first coil 602 is capable of receiving waves incident in the direction corresponding to the x axis,
- the second coil 604 is capable of receiving waves incident in the direction corresponding to the y axis, and
- the third coil 606 is of receiving waves incident in the direction corresponding to the z axis.

In alternative embodiments, each of the coil can be replaced by another emitting module, for example a patch antenna, orientated in the same direction as the coil it replaces.

Of course, the invention is not limited to the examples detailed above. For example, the security system of the pruning shears of the present invention may comprise several emitters, and/or several receivers.

The invention claimed is:

1. A portable electric pruning shears comprising:

- a longitudinal body intended to be held by a user;
- a cutting tool arranged at a distal end of said body;
- an electric motor for operating said cutting tool; and
- a security system provided to protect said user;

wherein said security system comprises:

- an emitter, configured for being worn by the user, for emitting at least one electromagnetic wave, and
- a receiver, integral with, or embedded in, the body of the pruning shears for receiving at least one electromagnetic wave emitted by said emitter;
- a control unit for acting on the operating of the cutting tool as a function of the at least one electromagnetic wave received by said receiver; and the emitter comprising several emitting modules, each said emitting module arranged for emitting a different electromagnetic wave in a different direction so that the emitter is able to emit different electromagnetic waves in different directions.

2. The pruning shears according to claim 1, characterized in that at least one said emitting module comprises an emitting coil.

3. The pruning shears according to claim 1, characterized in that the emitter is intended to be worn by the free hand of the user.

4. The pruning shears according to claim 3, characterized in that the emitter is integral with a glove, or wristband, intended to be worn by the free hand of the user.

5. The pruning shears according to claim 1, characterized in that the emitter is powered with an embedded battery.

6. The pruning shears according to claim 1, characterized in that the receiver comprises several receiving modules, each receiving an electromagnetic wave incident in a different direction.

7. The pruning shears according to claim 6, characterized in that at least one receiving module comprises a receiving coil.

8. The pruning shears according to claim 1, characterized in that the receiver is integral with the body of the pruning shears.

9. The pruning shears according to claim 1, characterized in that the receiver is powered with a power supply of the pruning shears.

10. The pruning shears according to claim 1, characterized in that the control unit acts on the electrical motor, or on a controller of the pruning shears, in order to trigger a command stopping the operating of the cutting tool, and/or opening the cutting tool.

11. The pruning shears according to claim 1, characterized in that the control unit is programmed to:

calculate a distance of the emitter with respect to the receiver based on the wave(s) received by the receiver, compare said distance to at least one predetermined threshold value; and act on the operating of the cutting tool, when said distance is below said threshold value.

12. The pruning shears according to claim 1, characterized in that the control unit is programmed to:

calculate a position of the emitter in a tridimensional coordinate system of the receiver, based on the wave(s) received by the receiver;

compare said position to a predetermined volume in said tridimensional coordinate system of the receiver; and act on the operating of the cutting tool, when said position is comprised in said predetermined volume.

13. The pruning shears according to claim 1, characterized in that the control unit is programmed to:

calculate a speed, called approaching speed, at which the emitter approaches the receiver; and act on the operating of the cutting tool as a function of said approaching speed.

14. The pruning shears according to claim 13, characterized in that the threshold distance value, and/or a size of the predetermined volume varies as a function of the approaching speed.

15. The pruning shears according to claim 1, characterized in that the control unit of the security system is integrated in a controller of the pruning shears.

16. The pruning shears according to claim 1, characterized in that the cutting tool comprises a moving blade and a fixed blade.

* * * * *